Dec. 23, 1958 G. W. BOOTH ET AL 2,865,567

MULTIPLE MESSAGE COMPARATOR

Filed June 22, 1954 5 Sheets-Sheet 1

INVENTOR.
LINDER L. HOBBS &
GRANT W. BOOTH
BY Morris Rabin
ATTORNEY

MULTIPLE MESSAGE COMPARATOR

Filed June 22, 1954 5 Sheets-Sheet 2

INVENTOR.
LINDER G. HOBBS &
GRANT W. BOOTH
BY Morris Rabkin
ATTORNEY

INVENTORS
LINDER C. HOBBS &
GRANT W. BOOTH
BY Morris Rabkin
ATTORNEY

Dec. 23, 1958 G. W. BOOTH ET AL 2,865,567

MULTIPLE MESSAGE COMPARATOR

Filed June 22, 1954 5 Sheets-Sheet 4

INVENTOR.
LINDER C. HOBBS &
GRANT W. BOOTH

BY Morris A. Rabkin

ATTORNEY

INVENTORS
LINDER C. HOBBS &
GRANT W. BOOTH
BY [signature]
ATTORNEY

United States Patent Office 2,865,567

Patented Dec. 23, 1958

2,865,567

MULTIPLE MESSAGE COMPARATOR

Grant W. Booth, Collingswood, and Linder C. Hobbs, Haddonfield, N. J., assignors to Radio Corporation of America, a corporation of Delaware Application June 22, 1954, Serial No. 438,372

16 Claims. (Cl. 235—61)

This invention relates to information handling systems, and particularly to systems for comparing a number of messages.

Modern automatic accounting systems are employed in many phases of commerce for the representation and handling of information. These systems include card handling systems and paper tape systems for sorting, classifying, and tabulating information. The latest developments in such information handling systems utilize techniques developed in the computing arts for storing and manipulating information through the use of magnetic tape as a recording medium.

The general problem which is usually solved by a sorting machine is the ordering of a sequence of information. It may be desired to arrange information in order, in accordance with particular blocks of information within a larger grouping of information. A common instance is the alphabetizing of names in the telephone directory.

Card sorters and paper tape sorters involve considerably more equipment, and require more cumbersome sorting techniques, than the newly developed electronic systems using magnetic tape. A card sorter may be required to sort successively a number of times, each time making a further delineation as to the characteristics of the intelligence which is being sorted. Similarly, paper tape systems often require either a number of sorting operations, or a considerable number of output devices, or both. Magnetic tape sorters, however, may utilize a temporary storage of information together with the eraseable qualities of magnetic tape to provide much greater sorting speeds and efficiency. A magnetic tape sorter is shown in an application for patent entitled "Sorting System," filed by Howard N. Guerber on May 3, 1954, Serial No. 427,167. The system described in that application operates on a so-called strings-of-two sorting procedure. The application also describes a further technique which may be termed progressive sorting. Progressive sorting uses the result of the last comparison in determining whether the next succeeding units to be compared follow in a desired order. Progressive sorting thus, as described in the application referred to, takes advantage of fortuitous groupings of random information.

A particular problem in sorting information is the observance of different rules when sorting numeric information than when sorting alphabetic information. The observance of these rules in a comparison may be termed justification, because the procedure is roughly analogous to the justification of words or numbers on a printed page. Consider an alphabetical listing, such as:

Jacobsen
Johnson
Jones

Note that each of the words has its most significant character in a common line, at the left of the word. With alphabetic information the relationships of the characters are most important in determining the order in which the words are to be placed. Only when one word is longer than another, and the words are otherwise identical, character for character, for the length of the shorter word, does the length of word control.

In dealing with numeric information, however, the length of a number is a primary importance in a comparison. Thus, a group of numbers may be written:

823
1236
48275

In this example, each of the least significant digits is in a common line at the right of the number. Length or a number of digits is of primary importance, and individual digit relationships govern, only when lengths are equal. In correspondence to the manner of aligning the different types of information, numbers may be said to be justified right, while alphabetic words may be said to be justified left.

A detailed analysis of the problems and rules involved in justifying is made in the patent entitled "Justification Device," to Linder C. Hobbs, No. 2,785,856, issued March 19, 1957, and assigned to the assignee of the present invention. Reference may be made to that patent for these rules of justification and an extended analysis is accordingly not presented here. Another system for justifying is described in an application for patent entitled "Message Comparator," filed November 27, 1953, by William R. Ayres and Joel N. Smith, Serial No. 394,693, and assigned to the assignee of the present invention. While both these justification systems operate accurately and reliably, each is intended primarily to perform a justification between two groupings of information. A sorter which uses a progressive sorting technique employs several of these systems. The retention and employment of information from the last previous comparison operation in a progressive sorter requires that a three-way comparison be made in each sorting step.

The Hobbs and the Ayres and Smith applications previously referred to set out a number of features which may be employed in a magnetic tape sorting system. These features are not completely described herein, because reference may be made to those applications. Only a brief description adequate to an understanding of the present invention is given herein. For purposes of illustration, however, the present system may be assumed to employ the binary system of notation and to represent alphabetic and numeric characters each by a fixed number of binary digits. Instead of a pure binary notation, however, each decimal digit may be represented by its binary equivalent in a binary code having a fixed number of digits. A character may be composed of a predetermined number, say seven, of binary digits, or bits. A variable number of characters, either alphabetic or numeric, may be grouped together to make an item, and a variable number of items may be grouped together to make a message. Added special signal combinations or symbols may be provided in accordance with certain rules. Messages may start with a start message (SM) signal, immediately followed by an item separation signal (ISS). Each pair of items within a message may be separated by an item separation signal, the last item of the message being followed by an end message (EM) signal.

Accordingly, it is an object of this invention to provide a novel system for comparing a number of messages.

A further object of this invention is to provide a novel justification arrangement for employment in a magnetic tape sorter using a progressive sorting technique.

A further object of this invention is to provide an improved justification system capable of providing many operations, more simply and rapidly than devices heretofore known.

Another object of this invention is to provide a justification system for a progressive sorter which performs a variety of functions and which utilizes standardized circuits in an arrangement characterized by economy and rapidity of operation.

Yet another object of this invention is to provide a system for justification operable with a sorter utilizing variable word lengths, which justification system performs a variety of complex functions simply, reliably, rapidly, and more economically than devices heretofore known.

In accordance with the invention, an arrangement is provided for comparing each of two input messages with each other and also with the last output message in a progressive sorter. Comparisons are made between individual characters from the two input messages and between the characters from the "newer" one of the input messages and the characters from the last output message provided from the sorter. The relative lengths of messages, and items within messages, are also determined. The final results of previous comparisons are retained within the justifier, thereby avoiding redundant comparison of the "older" input message with the last output message. The information thus retained and the comparison results are directed through gating arrangements which establish the desired justification rules and indicate the relationships of the messages. In this process, comparisons are continued until no longer wanted to determine the final relationship of the messages. The system then provides output indications of the relative values for controlling the order of precedence of the various messages.

The novel features of the invention, as well as the invention itself, both as to its organization and method of operation, will best be understood from the following description, when read in connection with the accompanying drawings, in which like reference numerals refer to like parts, and in which.

*General system structure and operation*

*General procedure.*—An arrangement for practicing this invention operates in response to staticized messages in an alpha-numeric code having special signal combinations. The arrangement determines the relationship between the signals and provides output signals for subsequent use in a sorting operation. A sorting procedure which may be employed is the progressive sorting technique described in the previously referred-to application of Guerber. The sorting system may employ two input and two output tapes and transfer information from the input tapes in a predetermined fashion to the output tapes, depending upon the relationship of the messages. The messages may be of variable length and may be composed of variable length items, each of which may consist of a sequence of characters. A particular segment of each message may be selected as the sorting criterion through use of an arrangement described in a copending application filed by L. A. Fernandez Rivas, entitled "Data Selection Device," Serial No. 431,627, filed May 24, 1954. The arrangement described selects a desired part from each message, by which part the message may be sorted into a desired relationship with respect to other messages.

In progressive sorters, it is desired to determine the relationship not only between two input messages, A and B, but also between these messages and the last selected output message, which may be called Z. If messages are to be sorted in a continuous sequence, for example with the smallest message first, the retention of the information as to the value of the last output entry enables the system to keep successively larger messages in order. When an entry is chosen for output in this type of sorter, the tape from which the output entry is taken is kept running. Thus, when a message on one input tape, say the A tape, is to be transferred to output, the A tape is run, a signal (AR) is provided to so indicate and the message on the B tape may be considered the "old" input message. If a message on the B tape is selected for output, the B tape is run, a signal (BR) is similarly provided and the message on the A tape is considered the "old" input message.

*General structure (refer to Fig. 1).*—Information from the last recorded entry, and from the A and B input tapes, is recorded in three information staticizing devices here called registers. The registers are herein identified as A, B, and Z registers, 10, 20, and 30, respectively, in correspondence to messages from the A and B tapes and the last recorded entry (Z), respectively. A number of well known devices are available for providing this staticizing function. One device which may be employed in a plurality of bistable multivibrators in parallel, each responsive to one binary digit of a character in the alpha-numeric code.

Figure 6:
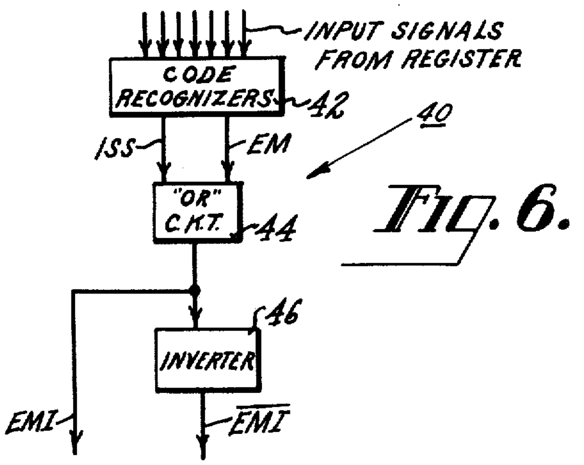
Fig. 6 is a schematic diagram of a recognition gate arrangement which may be employed in the arrangement of Fig. 1.

The registers 10, 20, 30 provide characters in the alpha-numeric code through multi-channel binary outputs. A fixed number of outputs, say seven, may be used. In the course of a message comparison the registers 10, 20, 30 staticize the successive characters from the selected portions of the messages. Coupled to the outputs of the registers 10, 20, 30 are individual recognition gate arrangements 40 for detecting the presence of the special signal combinations (SM, EM, or ISS) in the messages. The recognition gates 40 provide signals indicating both the presence and absence of the special character signals in the messages. An arrangement is shown in the Fernandez Rivas application for the detection of a special signal combination and an arrangement is shown in Fig. 6 for the generation of signals which indicate the presence (EMI) and absence ($\overline{EMI}$, or not EMI) of certain special signal combinations.

The outputs of both the A and B registers 10 and 20 are coupled to an A and B comparator, 50 and to an A or B and Z comparator 60. The output of the Z register 30 is provided only to the A or B and Z comparator 60. The A and B comparator 50 may be of a type described in a copending application for patent entitled "Electronic Comparator," Serial No. 375,869, filed August 24, 1953, by Philip Chielik, assigned to the assignee of the present invention. The A and B comparator 50 operates in response to two staticized characters and to timing, or sensing, signals to provide a distinctive output indicating the relative magnitude of the two characters. The A or B and Z comparator 60 may operate in response to three staticized characters, timing or sensing signals, and selector signals, to provide distinctive outputs indicating the relative magnitudes of the three characters. At any one point in time, the comparator 60 may compare a character from either of the two input messages A or B with a character from the output message Z. A comparator which may be employed for this purpose is shown and described in a copending application for patent entitled "Multiple Character Comparator," Serial No. 426,712, filed April 30, 1954, by Stephen M. Fillebrown and Grant W. Booth, and assigned to the assignee of the present invention.

Figure 2:
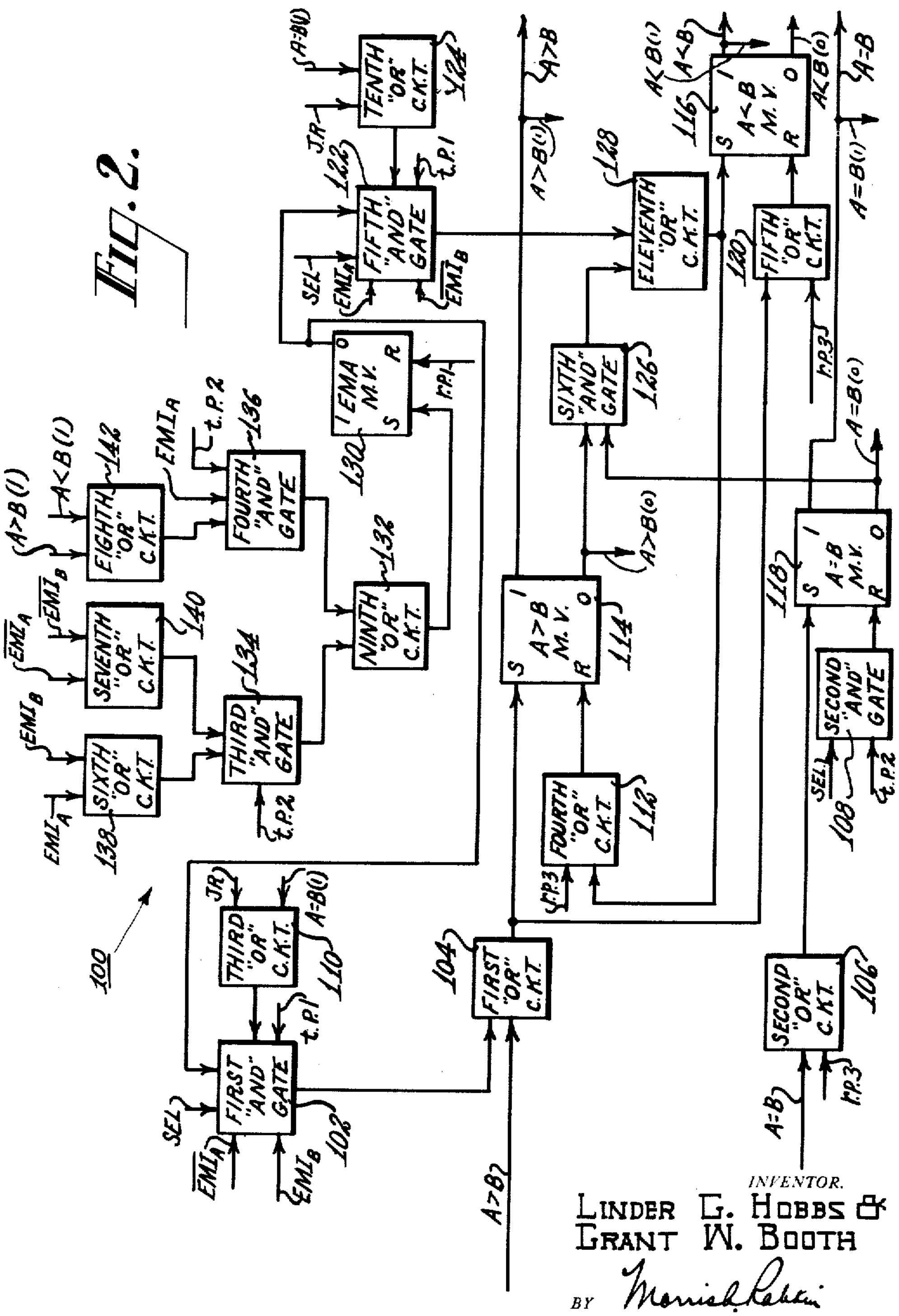
Fig. 2 is a schematic diagram of a two-way justifier which may be employed in the arrangement of Fig. 1.
Figure 3A:
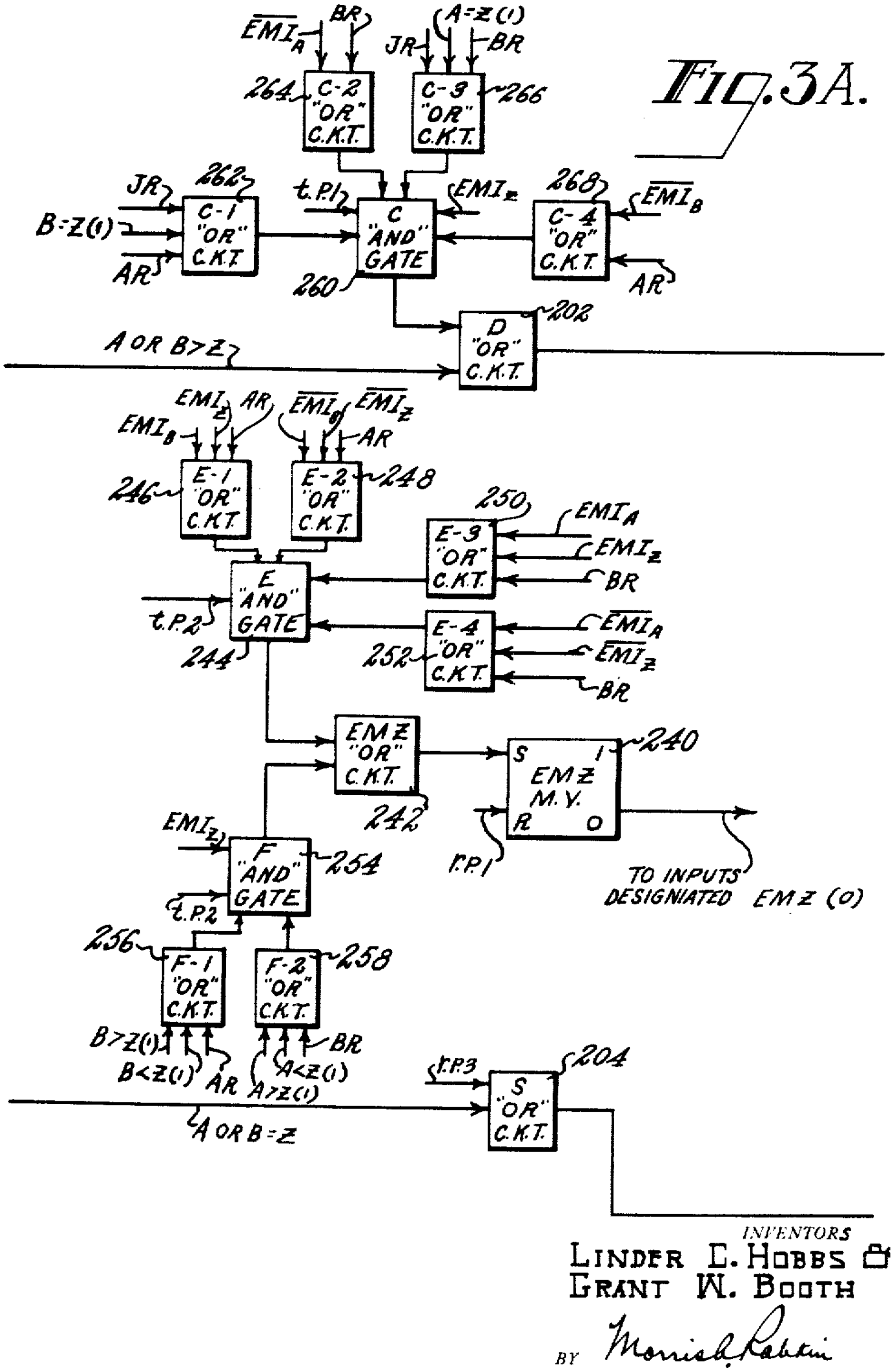
Figs. 3A and 3B are schematic diagrams of a multiple justifier which may be employed in the arrangement of Fig. 1.
Figure 4:
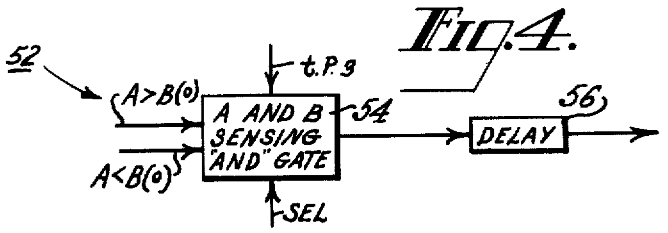
Fig. 4 is a schematic diagram of a two-way sensing control which may be employed in the arrangement of Fig. 1.
Figure 5:
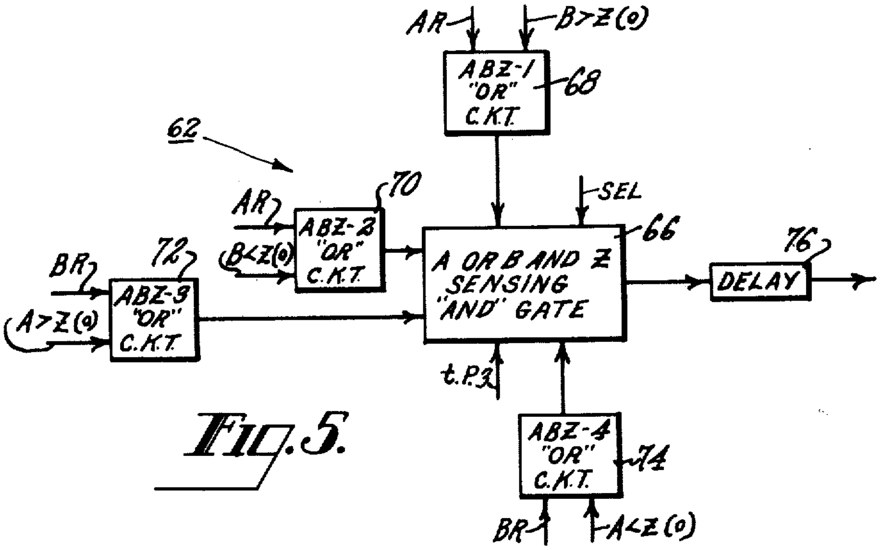
Fig. 5 is a schematic diagram of a multiple sensing control which may be employed in the arrangement of Fig. 1.

The A and B comparator 50 provides outputs to an A and B justifier 100, an arrangement for which is provided in Fig. 2. The A or B and Z comparator 60 provides outputs for an A or B and Z justifier 200, an arrangement for which is provided in Fig. 3. Each of the comparators 50, 60 has a sensing control; an A and B sensing control 52 being shown in Fig. 4, and an A or B and Z sensing control 62 being shown in Fig. 5. The justifiers 100, 200 provide a plurality of outputs on a plurality of output lines, the configuration of the output signals representing, when the comparison is finally complete, the relationships between the three messages and the system outputs.

Various other sources of signals are utilized with this comparison and justification system. A justify right control signal may be provided by a manual switch 80 coupling each of the justifiers 100, 200 through a justify right contact 82 to a source of direct current 86. With the switch 80 to a justify left contact 84 no control signal is provided, and the arrangement, as will be seen later, justifies left. A signal which indicates that data is to be selected may be provided from the arrangement shown in the Fernandez Rivas application. This data selection signal is provided during the presence of the desired segment, or serial number portion, of an input message, and the source is here designated as a source of select data signals 92. The Fernandez Rivas application also provides a source of reset signals 90 and a source of timing signals 88 for the system of Fig. 1. The timing signals or timing pulses (*tp*) may be provided in the same manner as in the Fernandez Rivas application. That is, each character sensed at a tape reading station may provide a signal to a series of delay lines, and taps along the delay lines may provide sequential pulses on different conductors. A similar arrangement may be employed for providing a series of reset signals from the signal which is to commence the selection of data.

The reset signals or reset pulses (*rp*) are provided at the start of the justification of three messages. Timing signals (*tp*) are provided subsequent to the occurrence of each individual character in the registers. Three reset signals, designated successively as *rp*1, *rp*2, and *rp*3, may be provided, and four timing signals, designated from *tp*1 to *tp*4 may also be provided.

In a progressive sorting scheme, a decision as to an output entry results in the operation of a given input tape. Signals are also provided which indicate which of the input tapes, A or B, is employed, these signals being designated as AR and BR, respectively. The source of signals is designated in Fig. 1 as the source of tape used signals 94.

*The general sequence of operation*

Operation of this system commences with the staticizing of the first characters of the messages to be compared. In accordance with the convention employed in the previously identified applications this message comparison is said to be a justification. The registers 10, 20, 30 generate the signals for the individual characters of the messages A, B, and Z until a comparison has been completed. Individual characters for the messages will be identified as characters A, B, and Z, corresponding to the messages in which they occur. At the start of a comparison, a selection signal is provided from the source of select data signals 92 and a sequence of reset signals (*rp*1, *rp*2, and *rp*3) is provided from the reset signal source 90. The mode of justification is selected by throwing the manual switch 80 to the justify left or justify right contact 84 or 82, respectively. Timing signals (*tp*1 to *tp*4) are provided as previously described.

At the start of a message comparison the result of the previous comparison of A and B is switched into the A or B and Z justifier 200. Then A is compared with B and A or B is compared with Z, character by character. Special signal combinations may occur and determine the relationship of the messages in accordance with the rules of justification under which the system is operating. The comparison and justification process proceeds from character to character until a significant relationship is detected, or until the data selection signal is terminated. At the end of this operation the configuration of signals on the system outputs manifests the relationships between the three messages, A, B, and Z. When starting, with no previous A and B comparison, any given relationship may be assumed to provide the Z for the A or B and Z justification.

*Individual circuit operation*

Figure 1:
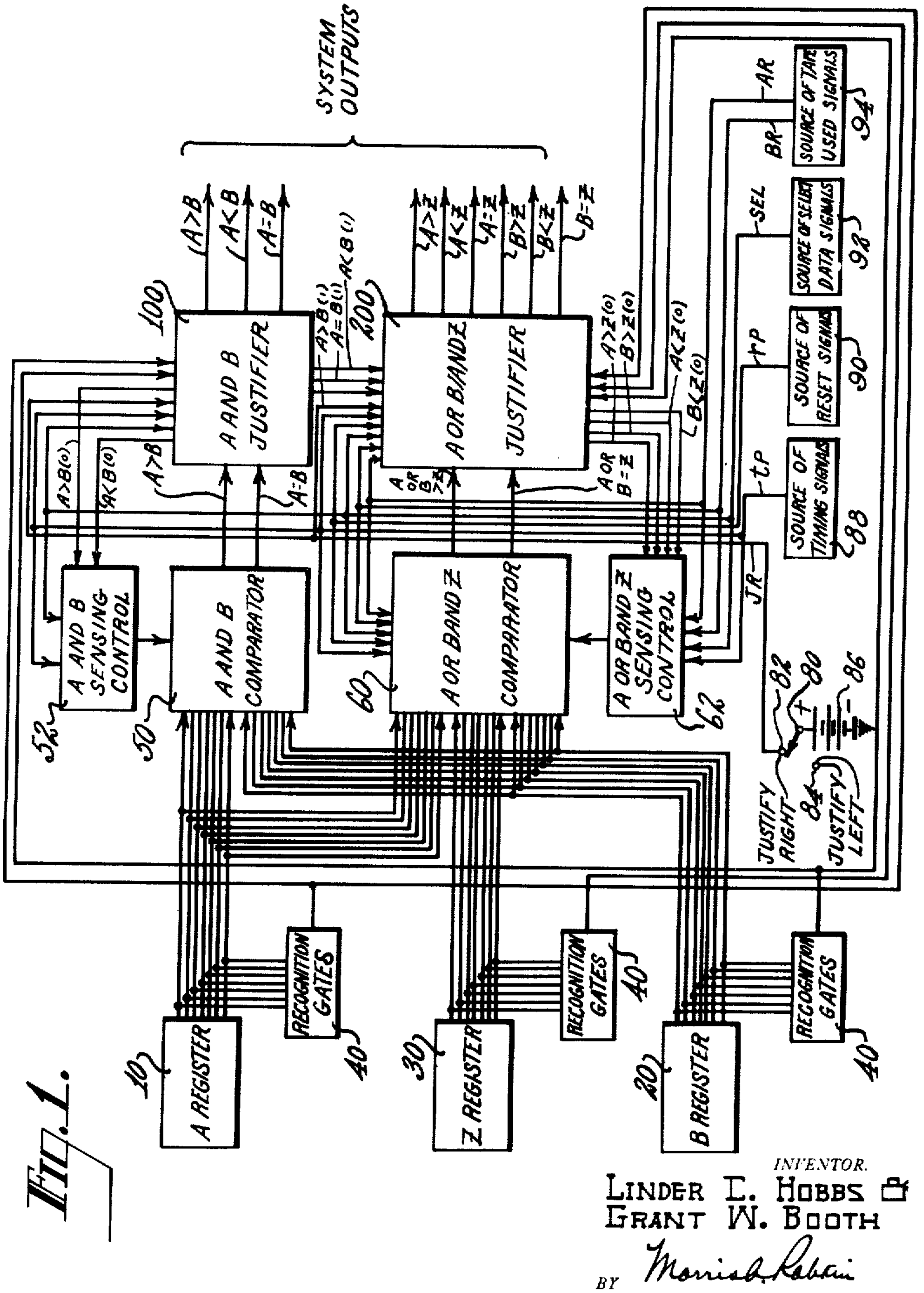
Fig. 1 is a schematic diagram of an arrangement for practicing the invention which employs recognition gates, a two-way comparator, a multiple comparator, a two-way justifier, a multiple justifier, a two-way sensing control, and a multiple sensing control.

Following are descriptions of the operation of the various individual units of Fig. 1. Each justifier description first pertains to a cycle which commences with the start of a message comparison and which compares only one character. The comparison is assumed to include only regular characters, and no special signal combinations. Each justifier description then pertains to a cycle of operation involving length inequalities.

*Code recognizers.*—EM and ISS signals are provided from the blocks identified as recognition gates 40 in Fig. 1. These blocks are shown elsewhere in greater detail (refer to Fig. 6) and include code recognizers 42 responsive to the registers (not shown) with which the recognition gates are associated. The signals provided by the registers (not shown) are steady and continuous during the comparison. A code recognizer, an example of which is shown and described in the Fernandez Rivas application, generates a similar steady state signal in an output channel when the proper input signal configuration is present. In Fig. 6, code recognizers 42 are employed for ISS signals and EM signals. Because ISS and EM signals have the same logical effect in this comparison, each of the signal conductors is directed to an "or" circuit 44 having two inputs and a single output.

An "or" circuit, sometimes called a mixer or buffer, provides an output when any one or more of its plurality of inputs is activated. The output of the "or" circuit 44 carries signals of two different amplitudes, only the higher of which is a useable signal in the system. The output of the "or" circuit 44 may be considered to designate the presence of either EM or ISS signals and accordingly has been designated as an EMI conductor. A branch from this conductor is directed through an inverter 46 to provide a signal which indicates the absence of an EMI signal. When a high level signal is provided on an EMI conductor the output of the inverter is a low level signal. When the signal on the EMI conductor is a low level output, however, the $\overline{\text{EMI}}$ output of the inverter is a high level output. Therefore, the EMI output represents the presence of EM or ISS signals, and the $\overline{\text{EMI}}$ output represents the absence (not EMI) of the same signals. Throughout the system, designation of an input as EMI or $\overline{\text{EMI}}$ will indicate couplings to the corresponding outputs of the recognition gates. The addition of a subscript to these designations will further indicate which of the recognition gates is specified as an input. This convention is used for clarity in the drawing and description.

*A and B sensing control operation (see Fig. 4).*—A selection signal is provided at the start of an operation. The selection signal (SEL) is provided to one input of a four input "and" gate, here designated as the A and B sensing "and" gate 54. An "and" gate, sometimes called a coincidence gate, is well known in the computing art and provides an output when and only when each of its plurality of inputs is activated. The remaining inputs of the A and B sensing "and" gate 54 are responsive individually to signals from *tp*3, $A>B(0)$, and $A<B(0)$, utilizing a short-hand designation for the outputs of the different multi-vibrators. The signals designated as $A>B(0)$ and $A<B(0)$ are provided, as will be seen later in connection with the A and B justifier, on commencement of a cycle and until an inequality is detected. These signals therefore activate two of the inputs of the A and B sensing "and" gate 54, and may be said to "prime" these inputs with steady state signals. The remaining or fourth "and" gate 54 input is responsive to *tp*3 signals following the generation of each character signal. On the occurrence of each *tp*3 signal, therefore, the A and B sensing "and" gate 54 has all four inputs activated, and provides an output. This output is directed through a delay line 56 to the A and B comparator (shown in Fig. 1). The delay provides a sufficient time lapse to eliminate the danger of the lead portion of *tp*3 traveling through the system and back to the comparator before the trailing portion of *tp*3 has passed. The delayed pulses serve the function of the timing pulse in the comparator described in the Chielik application. The comparator then provides an output on a terminal representative of the relationship between the characters then being staticized.

*Operation of the A and B justifier*

*Character comparison cycle (refer to Fig. 2).*—When the sensing control for the A and B comparator provides an output at the beginning of a cycle, the comparator may provide an output to the A and B justifier 100 on one of two output lines, the $A>B$ and $A=B$ outputs. An A<B output is not employed herein, the absence of the other two conditions being utilized to detect this condition.

Prior to the comparison of the first characters from the A and B messages a selection signal (SEL) is generated by the data selection unit. As stated previously, the signal which provides the steady state data selection signal also generates a sequence of reset signals (*rp*1, *rp*2, and *rp*3). Therefore, in the A and B justifier 100 the selection signal activates one input of a six input first "and" gate 102, one input of a two input second "and" gate 108, and one input of a six input fifth "and" gate 122. These "and" gates may be of the type previously described.

The first of the sequence of reset signals (*rp*1) activates one input of a bistable multivibrator 130 designated as the EMA multivibrator. A bistable multivibrator, sometimes called a flip-flop, has two stable states, and comprises a symmetrical arrangement of two sections which provide simultaneous outputs of different amplitudes. That is, one section of the multivibrator provides a high level output while the other section provides a low level output. Because of the symmetry of the two sections, the outputs provided from the sections may be reversed to provide an opposite steady state condition. Input signals may be applied separately to the two different sections, and a signal applied to the input of either one of the two sections causes the multivibrator to provide a high level output from that section. The inputs and outputs for each section have herein been given particular designations. One section is a "reset" (R) input and a "0" output, while the other section has a "set" (S) input and a "1" output. A multivibrator is "reset" to a starting condition of "0," in this example, and may then be "set" to a "1" condition. The EMA multivibrator 130 is used to terminate the operation of the A and B justifier during one message comparison. The "0" output of the EMA multivibrator 130 is coupled to an individual input of the first "and" gate 102 and the fifth "and" gate 122.

The second reset signal (*rp*2) is not employed in the A and B justifier. The third reset signal (*rp*3), however, activates one input of a second "or" circuit 106, the output of which activates the set input of an $A=B$ multivibrator 118. The $A=B$ multivibrator 118, which may be of the type previously described, provides an $A=B$ output on one of the system output terminals. The *rp*3 signal also impulses one input of a fourth "or" circuit 112 and one input of a fifth "or" circuit 120. The fourth "or" circuit 112 impulses the reset side of an $A>B$ multivibrator 114 and the fifth "or" circuit 120 impulses the reset side of an $A<B$ multivibrator 116.

The "or" circuits, the "and" gates, and the multivibrators described herein may be of the types previously described. The multivibrators will be given designations which show the significance of their outputs; the "or" circuits and "and" gates, however, may have different numbers of inputs.

Following *rp*3, therefore, the outputs of the three multivibrators 114, 116, 118 which provide the system outputs $A>B$, $A<B$, and $A=B$ on their "1" terminals are as follows: the $A>B$ and $A<B$ multivibrators 114 and 116 respectively, provide high level outputs on their "0" terminal, and the $A=B$ multivibrator 118 provides a high level output on its "1" terminal. In addition, the EMA multivibrator 130 provides a high level output on its "0" terminal.

In this example, the mode of operation will be assumed to be a justification to the right, so that a steady justification right (JR) signal is provided. The JR signal activates one input of a third "or" circuit 110 and one input of a tenth "or" circuit 124. The output of the third "or" circuit 110 primes one input of the first "and" gate 102, and the output of the tenth "or" circuit 124 primes one input of the fifth "and" gate 122. At this point in time the system awaits the sequence of timing signals (*tp*1 to *tp*4) and the decision of the A and B comparator 50.

The first timing signal (*tp*1) activates one input of the first "and" gate 102 and one input of the fifth "and" gate 122. Neither of these "and" gates provides an output, however, because each requires that at least one significant signal combination be present. More specifically, the two inputs not previously described of the first "and" gate 102 are responsive to $\overline{EMI_A}$ and $EMI_B$ signals. The two previously undescribed inputs of the fifth "and" gate 122 are responsive individually to $EMI_A$ and $\overline{EMI_B}$ signals. Because we have assumed that special signal combinations do not exist in this comparison and comparison of these first characters, the first "and" gate 102 and fifth "and" gate 122 do not provide an output in this instance.

The second timing signal (*tp*2) activates one input of the second "and" gate 108, one input of a third "and" gate 134 and one input of a fourth "and" gate 136. The second "and" gate 108 output activates the reset input of the $A=B$ multivibrator 118, which multivibrator provides an output on its "0" terminal. The output of the $A=B$ multivibrator 118 primes one input of a sixth "and" gate 126 which has two inputs. The remaining input of the sixth "and" gate 126 is responsive to signals from the "0" terminal of the $A>B$ multivibrator 114. The output of the sixth "and" gate 126 is coupled to one input of an eleventh "or" circuit 128 the output of which is coupled to the set input of the $A<B$ multivibrator 116 and one input of the fourth "or" circuit 112. The output of the first "or" circuit 104 is also applied to an input of the fifth "or" circuit 120, resetting the $A<B$ multivibrator 116.

As stated previously, this initial description will include only the first characters of a cycle and will assume that no special signal combinations are present in these first two characters. For purposes of illustration, the result of the comparison in the A and B comparator may be said to be that A is greater than B. On occurrence of the $tp3$ signal (refer also to Fig. 4) the A and B sensing control provides a sensing signal to the comparator. The comparator provides an $A>B$ signal which is directed through a first "or" circuit 104 (Fig. 2) to the set input of the $A>B$ multivibrator 114. The $A>B$ multivibrator 114 then switches to provide an output on its "1" terminal, which output represents a system output that shows $A>B$.

When justifying right, which is analogous to comparing decimal numbers, a determination that an A character is greater than a B character does not necessarily mean that the A message is greater than the B message. The B message may be longer and therefore greater. Thus the $A>B$ signal should be retained until a comparison of lengths has been made, at which time the character comparison will control if lengths are equal.

Following the $tp3$ signal, therefore, the $A>B$ multivibrator 114 is providing a "1" output, the $A<B$ multivibrator 116 is providing a "0" output and the $A=B$ multivibrator 118 is providing a "0" output.

When an inequality, such as $A>B$, is signalled by the A and B comparator 50 (refer here also to Figs. 1 and 4), the sensing control 52 is inactivated for the remainder of the message comparison. The $A>B$ signal sets the A>B multivibrator 114 to provide a "1" output, which output does not prime an input and therefore disables the sensing "and" gate 54. Subsequent operations are directed to determining differences in item and message lengths.

A similar A and B justifier (referring again to Fig. 2) operation takes place when the comparator provides an $A=B$ output. The $A=B$ output is directed through the second "or" circuit 106 to the set input of the $A=B$ multivibrator 118 following the reset signals and the first two timing signals. The reset signals first switch the multivibrators to a desired starting configuration, the timing pulses then test the various "and" gates and switch the $A=B$ multivibrator 118 to the "0" terminal, following which the $A=B$ comparator output sets the $A=B$ multivibrator to energize the "1" terminal.

The $A=B(1)$ steady state signal is applied to individual inputs of the third "or" circuit 110 and the tenth "or" circuit 124. These inputs are employed in the course of determining whether the length of items or messages is unequal.

If $A<B$, no signal is provided from the comparator. The sequence of operation is then as follows: The reset signals set up the multivibrators 114, 116, 118 in a starting configuration, the first two timing signals test the various "and" gates and reset the $A=B$ multivibrator 118 as previously described, and the sixth "and" gate 126 (the inputs of which are activated by the "0" outputs of the $A>B$ multivibrator 114 and the $A=B$ multivibrator 118) provides an output to the set input of the $A<B$ multivibrator 116 through the eleventh "or" circuit 128. The $A<B$ multivibrator 116 then is switched to provide a "1" output. This action, in effect, states that $A<B$ when A is not greater than B or equal to B.

In summary, the operation of the A and B justifier in comparing a first A and B characters on the start of a message originates with the sequence of reset signals ($rp1$, $rp2$, and $rp3$). A waiting period then is provided during which the first two timing signals ($tp1$ and $tp2$) test for conditions of unequal lengths between the messages. On $tp3$ the comparator decision is directed into the justifier, setting the multivibrators to provide the proper system output. In justifying right, length comparisons are continued even though a character inequality has been indicated. In justifying either right or left, no further character comparisons need be made when a first character inequality has appeared.

Thus it may be seen that the justifier as a whole comprises a message comparison network utilizing a control unit or network to govern the operation of the output devices which manifest the relationship of the messages. The justifier also includes a comparison termination means for determining when a significant relationship has occurred and for thereupon disabling the justifier.

*Comparing relative lengths.*—Additional couplings and circuits are utilized in the arrangement of Fig. 2 to detect unequal lengths of items or messages. The detection is based on the occurrence at different times of the special signal combinations (ISS and EM) denoting the termination of items and messages.

The first and fifth "and" gates 102, 122 recognize that A is longer than B and that B is longer than A, respectively. The inputs to these "and" gates have been previously described. The reasoning which is fulfilled when the first "and" gate 102 provides an output is as follows: when justifying right or when prior comparisons have shown A to be equal to B, and during the occurrence of selection and $tp1$ signals, the coincidence of $\overline{EMI_A}$ (not $EMI_A$) and $EMI_B$ means that an item or message from the B input has terminated before the corresponding unit from the A input. The fifth "and" gate 122 signals that B is longer than A, under the reasoning that: when justifying right or when prior comparisons have shown A=B, and in the presence of selection and $tp1$ signals, the coincidence of $EMI_A$ and $\overline{EMI_B}$ (not $EMI_B$) means that an item or message from A must have terminated before the corresponding item or message from B, and that B is longer than A.

Once an inequality based on unequal message lengths has been determined the first and fifth "and" gates 102, 122 must be disabled from providing further outputs. The disabling action is accomplished by the control of the EMA multivibrator 130 which primes individual inputs of the first and fifth "and" gates 102, 122. The set input of the EMA multivibrator 130 is responsive to signals provided from an "or"—"and"—"or" cascade. A sixth "or" circuit 138 and a seventh "or" circuit 140 provide outputs to a third "and" gate 134. The sixth "or" circuit 138 is responsive to $EMI_A$ and $EMI_B$ signals, and the seventh "or" circuit 140 is responsive to $\overline{EMI_A}$ and $\overline{EMI_B}$ signals. An eighth "or" circuit 142 responsive to $A>B(1)$ and $3<B(1)$ signals provides a signal to one input of a fourth "and" gate 136. Another input of the fourth "and" gate 136 is responsive to $EMI_A$ signals. The outputs of both the third and fourth "and" gates 134, 136 are coupled through a ninth "or" circuit 132 to the set input of the EMA multivibrator 130.

The last-described arrangement, which may be termed a disabling control for the first and fifth "and" gates 102, 122, detects the existence of unequal lengths and thereupon provides the desired disabling effects. When both the sixth and seventh "or" circuits 138, 140 provide an output, the input combinations to those circuits is either a combination of $EMI_A$ with $\overline{EMI_B}$ or $EMI_B$ with $\overline{EMI_A}$. These combinations indicate that a terminating signal from one message is present but that a terminating signal from the other message is not present—thus, that an unequal length relationship exists. Because the special signal combinations are generated continually following the reading of a character, the third "and" gate 134 provides an output on the occurrence of the subsequent $tp2$ signal. The output of the third "and" gate 134 is directed through the ninth "or" circuit 132 to set the EMA multivibrator 130 and thus to disable the first and fifth "and" gates 102, 122.

The fourth "and" gate 136 detects the occurrence of a character inequality in items or messages of equal length. Either an $A>B(1)$ or an $A<B(1)$ signal provides an output from the eighth "or" circuit 142. When this "or" circuit 142 output and a terminating signal ($EMI_A$) are applied coincidentally to the fourth "and" gate 136, that "and" gate is primed to provide an output on the occurrence of the subsequent $tp2$ signal. The output of the fourth "and" gate 136 sets the EMA multivibrator 130 through the ninth "or" circuit 132. Only the $EMI_A$ signal need be detected here, because only equal length units are treated by this arrangement. If lengths are unequal, other parts of the system exercise control.

Relative length inequalities as determined by the first and fifth "and" gates 102, 122 provide system outputs in the same manner as comparator inequality signals. A first "and" gate 102 output is provided to the first "or" circuit 104 along with the $A>B$ output of the comparator. The fifth "and" gate output 122 is provided to the eleventh "or" circuit 128 along with the output of the sixth "and" gate 126. These signals therefore set the $A>B$ multivibrator 114 and $A<B$ multivibrator 116, respectively, and disable the A and B sensing control in the manner previously described.

The difference between the justifying right and justifying left arrangements may be seen at the inputs to the third "or" circuit 110 and tenth "or" circuit 124. When justifying right the JR signal continually activates each of these circuits. When justifying left, however, the $A=B(1)$ signal must be present during each $tp1$ for the first and fifth "and" gates 102, 122 to be capable of acting. This situation conforms to the rule that when justifying left as in an alphabetical listing, the first character inequality is decisive of the relationship between the messages, but that when justifying right unequal lengths are decisive.

Thus, in summary, when justifying right even though no further character comparisons are made, the A and B justifier detects relative item and message length inequalities, and uses these inequalities to provide a system output. When justifying left the A and B justifier provides a system output on comparator inequality signals but continues on to compare relative lengths as long as characters are equal.

*The A or B and Z sensing control*

The A or B and Z sensing control 62 (refer to Fig. 5) actuates the A or B and Z comparator for each successive character comparison until character comparisons are no longer needed. The A or B and Z sensing control thus operates like the A and B sensing control, but fulfills the added requirements imposed by the comparison of either of two messages with a third. The operation of the sensing control follows one pattern whether A is being compared with Z or whether B is being compared with Z. The separate comparisons are indicated by the AR and RB signals and are distinguished by the sensing control.

The A or B and Z sensing control 62 uses a sixth input sensing "and" gate, termed herein an A or B and Z sensing "and" gate 66. This sensing "and" gate 66 has one input responsive to selection signals and another input responsive to $tp3$ signals. The remaining four inputs are coupled to the outputs of four "or" circuits 68, 70, 72, and 74, designated ABZ–1 to ABZ–4 and responsive to input signals as follows: (1) The ABZ–1 circuit 68 is responsive to AR and $B>Z(0)$ signals, (2) the ABZ-2 circuit 70 is responsive to AR and $B<Z(0)$ signals, (3) the ABZ–3 circuit 72 is responsive to BR and $A>Z(0)$ signals, and (4) the ABZ–4 circuit 74 is responsive to BR and $A<Z(0)$ signals.

The output of this sensing "and" gate 66 is directed through a delay line 76 to the A or B and Z comparator 60. The delay is sufficient to insure that the leading edge of $tp3$ does not overlap the trailing edge of $tp3$ at the comparator.

The A or B and Z sensing control 62 provides a signal for each successive character comparison as long as no inequality has been detected in the messages being compared. When the A tape is running, the A and Z messages are being compared. Therefore, signals which indicate that the comparison has hitherto produced equalities between A and Z are used to control the "and" gate 66. The AR signals are directed through the ABZ–1 and ABZ–2 "or" circuits 68, 70 to two of the inputs of the sensing "and" gate 66, to prime those inputs during the A and Z comparison. In the presence of a selection signal (SEL), and on the recurrence of each $tp3$, the signals applied to the ABZ–3 and ABZ–4 "or" circuits 72, 74 determine whether the sensing control provides an output. The ABZ–3 and ABZ–4 "or" circuits 72, 74 both provide an output only if both the $A>Z$ and $A<Z$ flip-flops in the A or B and Z justifier (not shown in Fig. 5) are providing "0" outputs. Such outputs indicate that the messages have so far been equal, and that the comparison should continue.

When the B tape is running, and a BR signal supplied, outputs are continually supplied from the ABZ–3 and ABZ–4 "or" circuits 72, 74 to the corresponding inputs of the sensing "and" gate 66. On the occurrence of a $tp3$ signal, therefore, and in the presence of a selection signal, the application of $B>Z(0)$ and $B<Z(0)$ signals to the ABZ–1 and ABZ–2 "or" circuits 68, 70, respectively, cause an output from the sensing "and" gate 66 to effect the next character comparison.

*Operation of the A or B and Z justifier*

The A or B and Z justifier 200 (referring to Fig. 3) consists of two justification units, each of which is similar to the A and B justifier 100 but includes additional arrangements for recognizing and dealing with special relationships involved in handling two different comparisons. The A or B and Z justifier 200 transfers information in from the previous setting of the A and B justifier 100, and compares A or B with Z depending upon the tape which is running. For clarity Fig. 3 has been divided into two sections, designated 3A and 3B. To represent Fig. 3 these sections should be placed side by side, with Fig. 3A on the left.

The additional units of the A or B and Z justifier include a disabling control (the output of which is provided from a multivibrator termed the EMZ multivibrator 240) similar to the like unit (EMA multivibrator) of the A and B justifier 100 and an added terminating control (governed by a C "and" gate 260, Fig. 3A) for providing an additional recognition function.

The three main operations of the A or B and Z justifier are the proper retention of the results of the previous A and B comparison, the determination of the length of the units of the A or B message in relation to the like units of the Z message, and the proper correlation of relative length determinations with the results of character comparisons.

Because the A or B and Z justifier 200 includes two like units and additional arrangements common to both these units a complete description of all possible modes of operation is not given here. The description first given will assume that the A tape is running and that comparison is therefore to be made between A and Z. The description will also assume that the previous A and B comparison is to be transferred in as the new B and Z comparison, and that justification is to the right. It will be understood that different modes of operation may obtain (B tape running, A and B comparison transferred in as A and Z comparison, for example) and that the same general description may be applied with the different units then involved.

The first description will relate to the operation of the A or B and Z justifier on the commencement of a message and the comparison of a first pair of characters. This description will assume that no special signal combinations are present in the first character comparison. The second type of operation to be described will immediately follow, and will describe how the justifier determines relative inequalities in lengths.

*Operation in character comparison.*—The two like arrangements which compare A with Z messages and B with Z messages, respectively, employ $A>Z$, $A<Z$ and $A=Z$ multivibrators 222, 224, 226, and $B>Z$, $B<Z$ and $B=Z$ multivibrators 276, 278, 280 (Fig. 3B) as in the A and B justifier. There are thus several groups of bistable devices, the condition of stability of which indicates the relationships of the several messages. The "1" outputs of the multivibrators are the outputs of the system.

Previous settings are cleared on the start of an operation and have no effect on ultimate system outputs. On the generation of a selection signal (SEL), a signal is applied to individual inputs of a D "and" gate 209, an L "and" gate 214, an M "and" gate 216, a U "and" gate 230, and a V "and" gate 234. The operation of these gates will become apparent as the conditions under various other signals are applied to them are explained.

In this example, we are assuming that the process is a justification right, and that the last message selected was from the A tape, so that the A tape is running. JR and AR signals are therefore applied to the system. The JR signal is directed through a U "or" circuit 228 to one input of the U "and" gate 230. The steady state AR signal primes one input each of the D "and" gate 209, the L "and" gate 214, the M "and" gate 216, and the U "and" gate 230. The presence of the AR signal means the absence of a BR signal, so that signals are not applied to a G "and" gate 206 or to an H "and" gate 212. In this operation, therefore, the G and H "and" gates 206, 212 are disabled and do not provide outputs.

We assume that the previous comparison of A and B showed that the A message was greater than the B message. An $A>B(1)$ signal from the A and B comparator 50 is therefore initially applied to one input of the G "and" gate 206. The G "and" gate 206, however, is disabled because of the lack of a BR signal on another of its inputs. The H "and" gate 212 is also disabled in this instance, because of the lack of an $A=B(1)$ signal at one of its inputs.

R*p*1 is generated at the start of the message comparison. R*p*1 is directed to the reset input of the EMZ multivibrator 240 (Fig. 3A) to set that multivibrator such that it provides a "0" output. The EMZ multivibrator 240 is analogous to the EMA multivibrator in the disabling control of the A and B justifier, its function being to terminate comparison when certain inequalities have been encountered. An EMZ(0) signal is applied (Fig. 3B) to individual inputs of the D "and" gate 209, the L "and" gate 214, and the U "and" gate 230. Note that in this state both the D and L "and" gates 209, 214 have all inputs but one activated, so that the occurrence of a signal on the remaining input will provide an output from each of these gates 209, 214.

The *rp*1 signal activates an AZ–2 "or" circuit 210 which provides an output to the reset side of the $A>Z$ multivibrator 222. The $A>Z$ multivibrator 222 therefore provides a "0" output to one input of the V "and" gate 234. R*p*1 is further applied to the reset input of the $A=Z$ multivibrator 226 through an AZ–4 "or" circuit 220. The resultant "0" output from from the $A=Z$ multivibrator 226 primes another input of the V "and" gate 234. The *rp*1 signal also activates one input of an AZ–6 "or" circuit 236, which circuit provides an output to the reset input of the $A<Z$ multivibrator 224. The $A<Z$ multivibrator 224 then provides a "0" output.

On *rp*2 the remaining input of the G "and" gate 206 is activated. No output is provided from this gate, however, because of the absence of the BR signal. The output would be provided to the set input of the $A>Z$ multivibrator 222 through an AZ–1 "or" circuit 208.

When an *rp*3 signal is provided an input of the H "and" gate 212 is activated, but no output is provided because of the absence of the BR signal. Outputs from the H "and" gate 212 are directed to an AZ–3 "or" circuit 218 and then to the set input of the $A=Z$ multivibrator 226. The *rp*3 signal is directed to an input of an S "or" circuit 204 of Figure 3A, the output of which is provided to the L "and" gate 214. All other inputs of the L "and" gate 214 being primed at this time, the L "and" gate 214 provides an output through the AZ–3 "or" circuit 218 to the set input of the $A=Z$ multivibrator 226. The $A=Z$ multivibrator 226 provides a "1" output on the system output line. The $A=Z$ multivibrator 226 was reset by the previous reset signal (*rp*1), but now is set again to provide a "1" output. This output is directed through an input of a U "or" circuit 228 to the U "and" gate 230.

On the termination of the reset signals the $A>Z$ multivibrator 222 is providing a "0" output, the $A<Z$ multivibrator 224 is providing a "0" output and the $A=Z$ multivibrator 226 is providing a "1" output. Thus the system, prior to the commencement of character comparison, is properly showing that the messages are equal.

Note again the assumption made here that in the comparison of first characters in the messages there are no special signal combinations. On the occurrence of the subsequent first timing signal (*tp*1) an input of the U "and" gate 230 is activated. The U "and" gate 230, however, which is also responsive to $EMI_A$ and $\overline{EMI_Z}$ signals, provides no output because of the absence of the $EMI_A$ signal. Outputs of the U "and" gate 230 are directed through the AZ–5 "or" circuit 232 to the set input of the $A<Z$ multivibrator 224 and also through the AZ–2 "or" circuit 210 to the reset input of the $A>Z$ multivibrator 222.

The *tp*2 signal is directed to an input of the M "and" gate 216. The remaining inputs of this gate were previously primed by the selection and AR signals and the M "and" gate 216 provides an output through the AZ–4 "or" circuit 220 to the reset input of the $A=Z$ multivibrator 226. The $A=Z$ multivibrator 226 is thus reset to provide a "0" output which primes one input of the V "and" gate 234.

At this point in time the justifier is prepared to use the results of the character comparison between the first characters of messages A and Z. The outputs provided from the justifier multivibrators at this time are $A>Z(0)$, $A<Z(0)$, and $A=Z(0)$. This output pattern is utilized in the process of eliminating the necessity for handling $A<Z$ signals, a fuller description of which feature is provided below. The previous sequence of reset and timing signals was employed for setting up the proper operation on the basis of the tape which was running, and for testing for the existence of unequal lengths between items or messages.

Figure 3B:
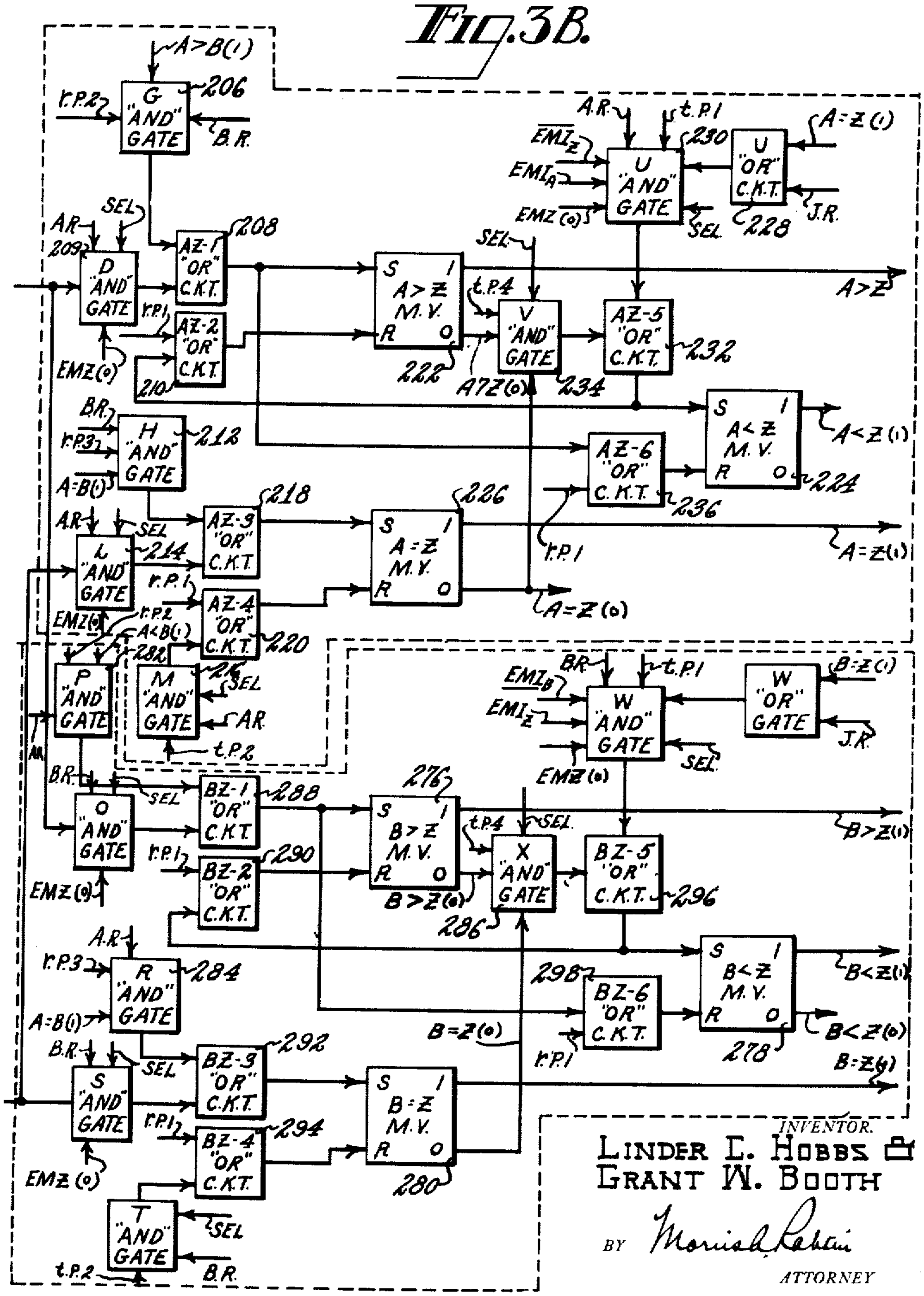

The *tp*3 signal activites the A or B and Z sensing control 62, and the A or B and Z comparator 60, as previously described. If the first character comparison made by the A or B and Z comparator 60 shows A to be less than Z, no signal is provided from the comparator and there is no change in the configuration of the system outputs. If A is greater than Z, however, an $A>Z$ output is provided from the comparator through the D "or" circuit 202 (Fig. 3A) to the D "and" gate 209 (Fig. 3B). At this point in time all other inputs of the D "and" gate 209 are primed and the D "and" gate 209 provides an output signal through the AZ–1 "or" circuit 208 to the set input of the $A>Z$ multivibrator 222. The $A>Z$ multivibrator 222 then provides a "1" system output. The output of the AZ–1 "or" circuit 208 is also directed through the AZ–6 "or" circuit 236 to the reset side of the $A<Z$ multivibrator 224, resetting that multivibrator to a "0" condition. The system thus provides a "1" output only on the $A>Z$ multivibrator 224.

If the A or B and Z comparator 60 determines that the first characters of the messages are equal, the comparator provides an $A=Z$ output. This output is directed through the S "or" circuit 204 (Fig. 3A) to the L "and" gate 214, all other inputs of which have previously been primed. The L "and" gate 214 provides an output through the AZ–3 "or" circuit 218 to the set input of the $A=Z$ multivibrator 226. The $A=Z$ multivibrator 226 provides a "1" system output. At this point in time, and in this situation, the system indicates only that $A=Z$.

The *tp*4 signal is applied to the input V "and" gate

234. If the remaining inputs of the V "and" gate 234 are primed by selection (SEL), $A>Z(0)$, and $A=Z(0)$ signals, then the V "and" gate 234 at this time provides an output to an input of the AZ-5 "or" circuit 232. The AZ-5 "or" circuit 232 then sets the $A<Z$ multivibrator 224 and resets, through the AZ-2 "or" circuit 210, the $A>Z$ multivibrator 222. Thus the *tp*4 signal, in the absence of a determination that $A>Z$ or $A=Z$, provides a system output that $A<Z$.

Without the occurrence of any special signal combinations, and with equality system outputs, this operation is repeated from *tp*1 on for each successive pair of A and Z character. When an inequality appears ($A<Z$ or $A>Z$) the sensing control (refer also to Fig. 5) is shut off and further character comparisons are not made. When justifying right, however, a decision cannot finally be made until the relative lengths of the messages, or of the successive items within the messages, are determined. When justifying right, therefore, no further character comparisons are made, but the system remains operative for detecting and utilizing special signal combinations. When justifying left, a message comparison may be terminated with the first character inequality. How this is done will be described in the next succeeding section.

*Operation in determining relative lengths.*—There are only three relationships which may exist between the special signal combinations from each of the messages. Special signal combinations may occur together, or a special signal combination from either one of the messages may occur before the corresponding combination from the other message. For example, an item or message termination signal ($EMI_A$) from message A may occur without a simultaneous item or message termination signal (not $EMI_Z$, or $\overline{EMI_Z}$) from the Z message.

The specific situation just given is that which is detected by the U "and" gate 230. The rule which must be satisfied for the U "and" gate 230 to provide an output may be paraphrased as follows: If an $EMI_A$ signal occurs without an $EMI_Z$ signal, with the A tape running, when justifying right and with the selection signal on and the disabling control off (EMZ(0)), then the U "and" gate 230 provides an output on the occurrence of *tp*1. The output of the U "and" gate 230 is directed through the AZ-5 "or" circuit 232 to the set input of the $A<Z$ multivibrator 224, and also through the AZ-2 "or" circuit 210 to the reset side of the $A>Z$ multivibrator 222. The system outputs thus indicate that A is less than Z, which corresponds to the fact that an item or message in A was shorter than the corresponding item or message in Z.

When a JR signal is provided, the U "or" circuit 228 primes an input of the U "and" gate 230 during this operation. During a justification left, however, no such signal is provided. The previous character comparisons, therefore, must show $A=Z$ for the determination of relative lengths to have a significance.

Note that the special signal combinations are staticized prior to the generation of timing signals, so that here as in the previous operations the timing signals test for the existence of certain special signal combinations.

The other possible situation of unequal lengths in this operation is that an item or message from Z may be shorter than the corresponding item or message from A. If this occurs an $EMI_Z$ signal will be provided without an $EMI_A$ signal. Such a signal configuration is detected by the C "and" gate 260 (Fig. 3A) in accordance with the following general rule: If an $EMI_Z$ signal occurs without an $EMI_A$ signal, during the provision of AR, and $A=Z(1)$ or JR signal, and during the application of a *tp*1 signal, the C "and" gate 260 provides an output. The C "and" gate 260 output is directed through the D "or" circuit 202 to the D "and" gate 209. The output of the D "and" gate 209 is directed through the AZ-1 "or" circuit 208 to set the $A>Z$ multivibrator 222 to a "1" output, and additionally through the AZ-6 "or" circuit 236 to reset the $A<Z$ multivibrator 224 to a "0" output.

Signals are applied to the inputs of the C "and" gate 260 through four "or" circuits 262, 264, 266, 268 identified as the C-1 to C-4 "or" circuits. Additional inputs are applied to the C "and" gate 260 from $EMI_Z$ and *tp*1 signals. Because either A or B is to be compared with Z, and because $EMI_Z$ will be used in both comparisons, the single "and" gate 260 may be used for the same purpose with either tape running. An overall economy is realized by the use of a number of "or" circuits, rather than a pair of "and" gates plus "or" circuits.

The general rules which are satisfied by the inputs to the C "and" gate 260 are the same as those for the U "and" gate 230, except that an additional requirement is imposed that the proper selection be made according to which tape is running. When justifying left, equality must exist between the characters previously compared for the C "and" gate 260 to provide an output. Thus, with the AR signal supplied, an $A=Z(1)$ signal is required at the C-3 "or" circuit 266 for that "or" circuit to provide an output. Note that during operation with the A tape running the AR signal provides a continuous output from the C-1 and C-4 "or" circuits 262, 268, thus priming the corresponding C "and" gate 260 inputs.

*Operation of the disabling control (EMZ multivibrator).*—The operation of the system in a message comparison is complete if any one of three conditions occur: (1) If justifying right and relative lengths are the same but a character inequality appears, (2) if justifying left and characters are unequal, (3) if relative lengths are not the same. These conditions are detected by the circuits and gates which activate a set input of the EMZ multivibrator 240. The EMZ multivibrator 240 (of Figure 3A) is employed for both AR and BR operation, and utilizes symmetrical arrangements for these operations. As previously, AR signals blank out or over-ride possible signals from the section which compares B with Z, so that the arrangement is actually concerned only with A and Z message characteristics. AR operation only will be described, and it will be understood that a similar operation obtains when the B tape is running.

Inputs to the set input of the EMZ multivibrator 240, which switch that multivibrator to what might be termed an "off" position, are applied to an EMZ "or" circuit 242. These inputs switch off the multivibrator 240, which provides an "0" output following *rp*1. The two inputs to the EMZ "or" circuits 242 are derived from an E "and" gate 244 and from an F "and" gate 254, respectively. Each of these "and" gates 244, 254 detects certain conditions which indicate that an inequality exists.

The E "and" gate 244 has five inputs, one of which is responsive to *tp*2 signals, and the other four of which are responsive to four "or" circuits 246, 248, 250, 252 identified successively as the E-1 to E-4 "or" circuits. AR signals are applied to the E-1 and E-2 "or" circuits 246, 248, and the outputs of these circuits provide priming signals for the corresponding inputs of the E "and" gate. The E-3 and E-4 "or" circuits 250, 252 have inputs responsive to BR signals. Because BR signals are not provided both the E-3 and E-4 "or" circuits 250, 252 will provide outputs only when $EMI_A$ or $EMI_Z$ and $\overline{EMI_A}$ or $\overline{EMI_Z}$ signals are provided. When one of these combinations exist both the E-3 and E-4 "or" circuits 250, 252 provide outputs, thus signalling the existence of a length inequality. On the occurrence of *tp*2 the E "and" gate 244 provides an output through the EMZ "or" circuit 242 to set the EMZ multivibrator 240. Thus length inequalities are detected whether justifying right or left.

The F "and" gate 254 determines whether character inequalities have been detected when the items or messages have been of equal length. One input of the F "and" gate 254 is responsive to $EMI_Z$ signals, another is responsive to *tp*2 signals, and two remaining inputs are responsive to the outputs of F-1 and F-2 "or" circuits 256, 258. An AR signal is directed through the F-1 "or" circuit 256 to prime the corresponding F "and" gate input 254. Other inputs to the F-1 "or" circuit are $B>Z(1)$ and $B<Z(1)$ signals. The inputs to the F-2 "or" circuit 258 are from $A>Z(1)$, $A<Z(1)$, and BR signals.

The F "and" gate 254 provides an output in response to a testing *tp*2 signal if an $EMI_Z$ signal occurs and an $A>Z(1)$ or $A<Z(1)$ signal is present. The $EMI_Z$ signal means that an item or message has terminated in Z and the $A>Z(1)$ and $A<Z(1)$ signals mean that there has been a character inequality. If there were an $EMI_Z$ signal alone, there would be a length inequality which would be detected as previously described. The output of the F "and" gate 254 sets the EMZ multivibrator 240 through the EMZ "or" circuit 242, switching the EMZ multivibrator 240 to a "1" output to effect a disabling control as previously described.

*Transfer in of results of previous A and B comparison and justification.*—Three multivibrators 276, 278, 280 (Fig. 3B) are utilized in the comparison and justification of B with Z. Only two of the "and" gates which control these multivibrators are responsive to AR signals. These "and" gates, in response to the reset and timing signals, comprise a transfer means to transfer in desired information from the A and B justifier. The AR signals prime individual inputs of a P "and" gate 282 and an R "and" gate 284. If the previous results of the A and B comparison was that A was less than B, an $A<B(1)$ signal is applied to one input of the P "and" gate 282. On the application of a subsequent *rp*2 signal to the remaining input of the P "and" gate 282, that gate provides a signal to the set input of the $B>Z$ multivibrator 276 through a BZ-1 "or" circuit 288. The output of the BZ-1 "or" circuit 288 is also applied to the reset input of the $B<Z$ multivibrator 278 through a BZ-6 "or" circuit 298. At this point in time the $B=Z$ multivibrator 280 is reset because of prior application of an *rp*1 signal through a BZ-4 "or" circuit 294. Only the B>Z multivibrator 276 therefore provides a "1" output. This output retains the information that the old A is less than B in the form that B is greater than Z. The old A is now the new Z.

If A is equal to B and an $A=B(1)$ signal is provided from the A and B justifier as the result of the last comparison, the operation is as follows: On *rp*3 all inputs of the R "and" gate 284 are activated and an output is provided through the BZ-3 "or" circuit 292 to the set input of the $B=Z$ multivibrator 280. The $B=Z(1)$ output is then the output from the system for this operation.

In the previous comparison of A and B messages, A might have been greater than B. The absence of other signals is used in this system to generate a proper system output. The $A>B(1)$ output is not applied in the system. Instead, on *tp*4 the X "and" gate 286 provides an output. At this point in time the X "and" gate 286 is primed by the selection signal, the $B>Z(0)$ signal, and the $B=Z(0)$ signal. The output of the X "and" gate 285 is directed through the BZ-5 "or" circuit 296 to the set input of the $B<Z$ multivibrator 278. The "1" output of the $B<Z$ multivibrator 278 is then the output of the system. Subsequent *tp*4 signals only repeat this operation. The lack of BR signals prevents spurious system outputs in the operation.

*Summary of system operation*

Following are various examples of the general operation of the system when justifying right and left and when encountering various message combinations. Assume that a first comparison begins with the conditions that alphabetic information is being compared and that therefore messages are being justified left, that an AR signal is provided, that the messages are to be placed in a descending alphabetic order, and that the following messages are provided:

A JONES●ROBERT●A●
B JOHNSON●SAM●
Z ANDERSON●AL●M●
(● represents a special signal combination)

With an AR signal provided the Z message is the old A and B comparison, which showed $A<B$. The result of this comparison is now transferred in and provides a $B>Z$ system output. The comparison of the above messages also shows, as system outputs, $A>B$ and $A>Z$. $A>B$ is determined by comparing the *n* in Jones with the *h* in Johnson, and $A>Z$ is determined by comparing the J in Jones with the A in Anderson.

Because the B input message is smaller (goes first alphabetically) than the A message the B message takes precedence in this operation. The B tape is then run and the B input message becomes the new Z output message. Because the B input message is greater than the previous Z message and follows in order after the Z message, the B message is put on the same output tape as the Z message.

With a new B input message provided (and with a BR signal) the next message comparison may be as follows:

A JONES●ROBERT●A●
B JONES●ROBERT●B●
Z JOHNSON●SAM●

The old A-B comparison which showed $A>B$ is the same as the new A-Z comparison. The old $A>B$ result is therefore transferred in to provide a new $A>Z$ system output. In the new comparison of A and B equalities are detected until the final characters are reached. The result of comparing the A of Jones Robert A with the B of Jones Robert B shows a message inequality of $A<B$. The B-Z comparison shows $B>Z$ on comparing the *n* in Jones with the *h* in Johnson.

Jones Robert A now takes precedence, and because this message should be first in relation to Johnson, is placed on the same output tape as the previous Z message.

A new pattern of signals may then be (with an AR signal now being provided):

A JONES●ROB●
B JONES●ROBERT●B●
Z JONES●ROBERT●A●

The old A-B comparison result of $A<B$ is now transferred in as the new B-Z comparison result of $B>Z$. The new A-B comparison shows $A<B$ because the unequal length of items following the *b* in Jones Rob. For the same reason the new A-Z comparison shows $A<Z$. The B input message is now to be employed as the output message, even though the "new" A input message is smaller. When a subsequent comparison shows both the A and B messages to be smaller than the last transferred message, then the smaller of the A and B messages is recorded on the alternate output tape in this system.

A justification left operation may compare two input numbers, A and B, with an output number Z as follows (assume that an AR signal is provided):

A 475●12●394●
B 398●16●3537●
Z 98●5●8480●

With the A tape running, the result of the old A-B comparison is transferred in as the new B-Z comparsion, which shows $B>Z$. The new comparisons are between A and Z and A and B. System outputs are provided that indicate $A>B$ and $A>Z$. A is greater than B because of the difference in the first characters and the equality of the first items in lengths. A is greater than Z because of the greater length of the first item of A.

Now the B input message becomes the new Z output message, and is placed on the same tape as the previous Z. A "new" B input message may be provided (and a BR signal supplied) and the following messages exist in the next comparsion:

A 475●12●394●
B 398●16●353●
Z 398●16●3537●

The old A–B comparsion becomes the new A–Z comparsion, showing $A>Z$. As a result of the new comparisons system outputs are provided that $A>B$ and $B<Z$. The A or "old" input message is greater than the B or "new" input message because of the unequal first characters of the first items and the equal length first items. B is less than Z because of a shorter third item, although the characters are equal. The B input message now becomes the new output and, because it is less than the old Z, is placed on a new tape.

Similar comparisons of messages consisting of varying length items may be extended indefinitely. The same modes of operation, however, will apply.

Thus there has been described a system for comparing a number of messages employing special signal combinations to denote the termination of items of variable lengths. Messages may be in alphabetic or numeric form and composed of variable numbers of items. An economy of design is achieved by eliminating redundant comparisons and by utilizing individual units for a multiplicity of functions wherever possible. A complex logical determination of the relationships of the messages may be made although the individual units employed may be standardized.

What is claimed is:

1. A system for comparing a plurality of messages made up of characters represented by binary electrical signals comprising a plurality of means for determining as between pairs of individual character signals from said messages which has the greater binary value, a plurality of means for determining as between given pairs of messages which is the longer, a plurality of message magnitude manifesting means to indicate relative equality and inequality as between messages, and means responsive to said character signal value determining means and said message length determining means for applying signals to said message magnitude manifesting means.

2. A system for comparing a plurality of messages each comprising characters grouped into items, each of said characters being identified as a different simultaneous group of binary electrical signals, said system comprising a plurality of means responsive to signals representing said messages for determining the relative binary value relationships as between pairs of individual character signals from said messages, a plurality of means responsive to said messages for determining the relative length relationships of given pairs of messages, a plurality of bistable means for manifesting relative message magnitude relationships, and means responsive to said character signal value relationship determining means and said relative length relationship determining means for controlling the conditions of stability of said bistable means.

3. In a system for determining the relationships of two input messages and an output message wherein on each succeeding determination one of the input messages becomes the output message, said messages each comprising characters grouped into items, each of said characters represented by a plurality of simultaneously appearing binary coded electrical signals, the combination comprising a first means responsive to signals representing said input messages for determining relative binary value as between individual character signals from said messages, a second means responsive to signals representing said input messages and signals representing said output message for determining relative binary value as between individual character signals from (1) one of said input messages and said output message and (2) the other of said input messages and said output message, a third means responsive to signals representing said input messages for determining which of said messages is the longer, a fourth means responsive to signals representing said input messages and signals representing said output message for determining which is the longer as between (1) one of said input messages and said output message and (2) the other of said input messages and said output message, a plurality of bistable means for manifesting relative message magnitudes, and control means responsive to said first, second, third, and fourth means for controlling the conditions of stability of said bistable means.

4. In a system for determining the relationships of two input messages and an output message wherein on each succeeding determination one of the input messages becomes the output message, said messages each comprising characters grouped into items, each of said characters represented by a plurality of simultaneously appearing binary coded electrical characters, the combination comprising a first means responsive to signals representing said input messages for determining relative binary value as between individual character signals from said messages, a second means responsive to signals representing said input messages and signals representing said output message for determining relative binary value as between individual character signals from (1) one of said input messages and said output message and (2) the other of said input messages and said output message, a third means responsive to signals representing said input messages for determining the relative length as between said messages, a fourth means responsive to signals representing said input messages and signals representing said output message for determining the relative length as between (1) one of said input messages and said output message and (2) the other of said input messages and said output message, a plurality of bistable means for manifesting message magnitude relationships, a first control means responsive to said first and second means for controlling the conditions of stability of a first group of said bistable means, and a second control means responsive to said third and fourth means and said first group of bistable means for controlling the conditions of stability of second and third groups of said bistable means, one group of said last-mentioned bistable means being controlled by the magnitude relationship between signals representing a given input message and signals representing said output message while the other group of bistable means is controlled by the last prior condition of said first group of bistable means after the immediately preceding determination.

5. In a system for sorting messages which utilizes the last output message as a part of the sorting process, the combination comprising a first means for comparing signals representing a new and signals representing an old input message, a second means for comparing signals representing said new input message and signals representing said last output message, and means responsive to said first comparing means for retaining and manifesting the last previous comparison of said new and old input messages.

6. In a system which selects an output message from one of two input messages, an arrangement for manifesting the relationship of said input messages with respect to each other and the last said output message, said arrangement comprising means for determining and signalling the relative magnitudes of signals representing said input messages and a pair of means for simultaneously and selectively (1) retaining signals representing the last signalled magnitude relationship of input message signals as determined by said first mentioned means, and (2) determining and signalling the magnitude relationship of signals representing one given input message with signals representing the last said output message.

7. In a system for sorting messages which utilizes the last output message as a part of the sorting process, said messages represented by a plurality of simultaneously appearing binary coded electrical signals, the combination comprising means for comparing signals representing a new and an old input message, and a pair of means for comparing, each of said pair comparing signals representing a different one of said old and new input messages with signals representing last output message, each of said pair of means including transfer means responsive to said means for comparing new and old input messages for manifesting the result of the last previous input message comparison and indicating the relative magnitudes of said messages, and including also means to effect comparison or transfer according to whether a said input message is new or old, respectively.

8. In a system for sorting messages which utilizes the last output message as a part of the sorting process, said messages appearing as a plurality of coded binary electrical signals, the combination comprising means for comparing signals representing a new and an old message, a first message comparison result manifesting means responsive to said means for comparing, a pair of message comparing means, each of said message comparing means comparing signals representing a different one of said new and old input messages with said signals representing last output message and including a transfer means responsive to said first message comparison result manifesting means for retaining the result of the last previous manifestation by said means and including also means to effect comparison or transfer according to whether a said input message is new or old, respectively, and second and third message comparison result manifesting means each responsive to a different one of said pair of message comparing means.

9. In a system which sorts message groupings of information from two input sources to one of two outputs, said message groupings made up of a series of characters comprising units, each of said characters being identified as a different simultaneous group of binary electrical signals, an arrangement for determining and manifesting the magnitude relationships of said input messages to each other and to the last said output message, said arrangement comprising a plurality of bistable devices the condition of stability of which indicate the relationships of the messages greater than, equal to or less than, a first means responsive to signals representing said input messages and coupled to a first group of said plurality of bistable devices for determining and signalling to said first group the magnitude relationship of said input messages, a second means responsive to signals representing a given one of said input messages, signals representing said last output message, and said first group of bistable devices and coupled to a second group of bistable devices of said plurality for alternatively (1) controlling said second group of bistable devices with the prior condition of said first group of bistable devices, and (2) determining and signalling to said second group of bistable devices the magnitude relationship of said one input message to said last output message whether greater than, equal to or less than, and a third means responsive to signals representing another one of said input messages, signals representing said last output message, and said first group of bistable devices and coupled to a third group of said bistable devices for alternatively (1) controlling said third group of bistable devices with the prior condition of said first group, and (2) determining and signalling to said third group the magnitude relationship greater than, equal to or less than of said other input message to said last output message.

10. A multiple message comparator for comparing electrical signals representing messages comprising a plurality of bistable devices the condition of each of which manifest one of the message magnitude relationships of greater than, equal to or less than, first, second, and third message comparison networks for determining the magnitude relationships of given pairs of messages and conditioning first, second, and third groups of said bistable devices thereby, and means coupling said first message comparison network to said second and third message comparison networks for alternatively controlling either one of said second and third groups of bistable devices in response to the last prior condition of said first group of bistable devices.

11. In a data-processing system which sequentially staticizes character signals from a plurality of messages greater than two, said messages being comprised of items made up of characters, said items separated by special symbols, each of said symbols and characters being identified as a different simultaneous group of binary electrical signals, an arrangement for comparing signals representing individual pairs of said plurality of messages to determine relative magnitude comprising a first comparator for the signals representing the characters of one given pair of messages, a first control unit responsive to said first comparator and to said special symbol signals for signalling the magnitude relationship of said given pair of messages, a second comparator for alternatively comparing signals representing characters of either message from said given pair of messages with signals representing the characters of a third message, and a second control unit responsive to said second comparator and said special symbol signals in the messages being compared by said second comparator for signalling the magnitude relationship of said messages, and also responsive to said first control unit for retaining the signalled magnitude relationship of the prior two messages last compared in that unit.

12. In a data-processing system which sequentially staticizes successive character signals of a plurality of messages greater than two, said messages being comprised of items separated by special character signals, said items comprised of characters, each of said characters and special characters being identified as a different simultaneous group of binary electrical signals, a system for comparing signals representing individual pairs of said plurality of messages comprising a first comparator for the character signals of one given pair of messages, a first control unit responsive to said first comparator and to said special character signals in said given pair of messages for signalling the relative magnitude of said given pair of messages, means coupled to said first control unit for disabling said first comparator on the determination of a message magnitude relationship, a second comparator for alternatively comparing signals representing characters from either message of said given pair of messages with signals representing a third message, a second control unit responsive to said second comparator and said special character signals in the messages whose character signals are being compared in said second comparator for signalling the magnitude relationship of said messages, said second control unit also being responsive to said first control unit for signalling the magnitude relationship of the last two messages compared in that unit, means coupled to said second comparator and said second control unit for disabling said second comparator and said second control unit on the determination of a significant message magnitude relationship, and a plurality of bistable devices coupled to each of said control units for manifesting the final magnitude relationship of the messages being compared.

13. In a system for sorting a plurality of messages, each of said messages being composed of characters grouped into items, each of said characters represented by a plurality of simultaneously appearing binary coded electrical signals, and which system provides a sequence of timing signals, an arrangement for comparing given pairs of signals representing said plurality of messages comprising a plurality of means for comparing signals representing characters from individual given pairs of said messages, a plurality of means for recognizing unequal groupings of character signals in the items of individual given pairs of said messages, and a plurality of control networks, responsive to said timing signals, said means for comparing character signals, and means for recognizing unequal groupings for detecting and signalling predetermined magnitude relationships of said given pairs of messages.

14. In a system for sorting messages which utilizes in the sorting process a newly presented input message, an older input message, and the message last transferred to output in the sorting process, each of said messages being composed of characters grouped into items, each of said characters being identified as a different simultaneous group of binary electrical signals, said system providing a sequence of timing signals and a signal denoting which of said input messages is the older input message, and arrangement for signalling the relative magnitude relationships of said messages comprising a first means for comparing the character signals of said input messages, a second means for comparing the lengths of said item groupings in said input messages, a first control network responsive to said timing signals, said first means, and said second means for detecting and signalling predetermined relative magnitude relationships between said input messages, a third means for comparing the character signals of one of said input messages with the character signals of said last transferred message, a fourth means for comparing the lengths of said item groupings from one of said input messages and said last transferred message, a second control network responsive to said timing signals, said third means, and said fourth means for detecting and signalling predetermined relative magnitude relationships between said messages, said second control network also being responsive to said denoting signal and said first control network for retaining the prior relative magnitude relationship determined by said first control network when the input message to be compared is the said older input message, a fifth means for comparing the character signals of the other of said input messages with the character signals of said last transferred message, a sixth means for comparing the lengths of said item groupings from the other of said input messages and said last transferred message, and a third control network responsive to said timing signals, said fifth means, and said sixth means for detecting and signalling predetermined relative magnitude relationships between said messages, said third control network also being responsive to said denoting signal and said first control network for retaining the prior relative magnitude relationship determined by said first control network when the input message to be compared is the said older input message.

15. A system for comparing two messages composed of character signals sequentially grouped into items having special separator signals, said system comprising means for comparing signals representing individual characters and signalling the relative magnitude relationship thereof, three bistable multivibrators, means for recognizing and signalling presence of special separator signals in one of said messages and not the other, a control network responsive to said means for comparing and said special signal recognizing means for controlling said multivibrators, and a comparison termination means responsive to said special separator signals, said special signal recognizing means, said means for comparing and said multivibrators, for disabling said means for comparing and said control network when a determinative relationship of relative magnitude between said messages has been recognized.

16. A system for comparing two messages composed of character signals sequentially grouped into items having special separator signals, said system comprising means for comparing the signals representing individual characters and signalling the relative magnitude relationship therebetween on only two outputs, three bistable multivibrators whose condition of stability manifests the relationship of equality and relative inequality of the messages, means for recognizing and signalling non-coincident occurrence of special separator signals, a control network responsive to said means for comparing and said special signal recognizing means for controlling two of said multivibrators, said control network including means for conditioning the third of said multivibrators in the absence of outputs on said two outputs from said means for comparing, and a comparison termination means responsive to said special separation signals, said means for recognizing non-coincident separator signals, said means for comparing and said multivibrators for disabling said means for comparing and said control network when a determinative relationship of relative magnitude between said messages has been recognized.

References Cited in the file of this patent

UNITED STATES PATENTS

| | | |
|---|---|---|
| 2,604,262 | Phelps | July 22, 1952 |
| 2,674,733 | Robbins | Apr. 6, 1954 |
| 2,735,082 | Goldberg et al. | Feb. 14, 1956 |

FOREIGN PATENTS

| | | |
|---|---|---|
| 1,040,913 | France | May 27, 1953 |